(12) United States Patent
Yu et al.

(10) Patent No.: US 10,674,383 B2
(45) Date of Patent: Jun. 2, 2020

(54) CHANNELS AND PROCEDURES FOR BEAM FAILURE RECOVERY

(71) Applicant: MEDIATEK INC., Hsinchu (TW)

(72) Inventors: Chia-Hao Yu, Hsinchu (TW);
Yuanyuan Zhang, Beijing (CN);
Ming-Po Chang, Hsinchu (TW);
Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/043,718

(22) Filed: Jul. 24, 2018

(65) Prior Publication Data

US 2019/0037423 A1    Jan. 31, 2019

Related U.S. Application Data

(60) Provisional application No. 62/536,520, filed on Jul. 25, 2017.

(51) Int. Cl.
*H04W 24/04* (2009.01)
*H04W 72/04* (2009.01)
(Continued)

(52) U.S. Cl.
CPC ........... *H04W 24/04* (2013.01); *H04B 7/06* (2013.01); *H04B 7/0695* (2013.01); *H04B 7/088* (2013.01);
(Continued)

(58) Field of Classification Search
CPC ............ H04W 24/04; H04W 72/0413; H04W 74/0833; H04W 16/28; H04B 7/088; H04B 7/0695; H04B 7/06
See application file for complete search history.

(56) References Cited

U.S. PATENT DOCUMENTS 8,755,755 B2   6/2014   Hoshino et al. ............... 455/280
8,767,875 B2   7/2014   Guo ............................. 375/299
(Continued)

FOREIGN PATENT DOCUMENTS

CN   105340132 A   5/2014
CN   106255209 A   2/2016
(Continued)

OTHER PUBLICATIONS

International Search Report and Written Opinion of International Search Authority for PCT/CN2018/097035 dated Sep. 25, 2018 (9 pages).
(Continued)

*Primary Examiner* — Brian D Nguyen
(74) *Attorney, Agent, or Firm* — Imperium Patent Works; Zheng Jin (57) ABSTRACT

A method of beam failure recovery request (BFRQ) transmission is proposed. In a first step of beam failure detection, UE detects a beam failure condition of the original serving beam. In a second step of new candidate beam identification, UE performs measurements for candidate beam selection. In a third step of beam failure recovery request (BFRQ) transmission, UE transmits a BFRQ message to BS upon the triggering condition for BFRQ transmission is satisfied. In a fourth step of monitoring BS response, UE monitors BS response to decide the success or failure of the BFRQ transmission attempt. In one advantageous aspect, the BFRQ transmission is over dedicated contention-free PRACH or PUCCH resources or over contention-based PRACH resources. Furthermore, a beam failure recovery timer is used to oversee the initiation and the termination of the BFRQ transmission.

20 Claims, 8 Drawing Sheets

(51) Int. Cl.
*H04W 74/08* (2009.01)
*H04B 7/06* (2006.01)
*H04B 7/08* (2006.01)
*H04W 16/28* (2009.01)

(52) U.S. Cl.
CPC ... *H04W 72/0413* (2013.01); *H04W 74/0833* (2013.01); *H04W 16/28* (2013.01)

(56) References Cited

U.S. PATENT DOCUMENTS

| | | | |
|---|---|---|---|
| 10,129,793 | B2 | 11/2018 | Ryoo et al. |
| 10,237,045 | B2 | 3/2019 | Liu et al. |
| 2013/0155847 | A1 | 6/2013 | Li et al. ............... 370/225 |
| 2014/0056256 | A1 | 2/2014 | Kim et al. ............... 370/329 |
| 2015/0017979 | A1 | 1/2015 | Kang et al. ............ 455/426.1 |
| 2015/0139116 | A1 | 5/2015 | Wang et al. ............ 370/329 |
| 2015/0333811 | A1 | 11/2015 | Yu et al. ............... 370/329 |
| 2016/0183232 | A1 | 6/2016 | Stirling-Gallacher et al. ........... 370/280 |
| 2016/0353510 | A1 | 12/2016 | Zhang et al. ............ 370/329 |
| 2017/0054534 | A1 | 2/2017 | Sang et al. ............ 370/332 |
| 2017/0188379 | A1 | 6/2017 | Shtrom et al. ........... 370/329 |
| 2017/0230849 | A1 | 8/2017 | Wei et al. |
| 2017/0346545 | A1* | 11/2017 | Islam ............... H01Q 1/245 |
| 2018/0110066 | A1 | 4/2018 | Luo et al. |
| 2018/0176801 | A1* | 6/2018 | Rune ............... H04B 7/0695 |
| 2018/0192443 | A1 | 7/2018 | Novlan et al. |
| 2018/0219604 | A1 | 8/2018 | Lu et al. |
| 2018/0359790 | A1* | 12/2018 | Ingale ............... H04W 8/24 |
| 2018/0375556 | A1* | 12/2018 | Wang ............... H04B 7/061 |
| 2019/0174549 | A1* | 6/2019 | Xu ............... H04W 74/08 |

FOREIGN PATENT DOCUMENTS

| | | |
|---|---|---|
| WO | WO02013024942 A1 | 8/2011 |
| WO | WO02016011199 A1 | 7/2014 |
| WO | WO02016172840 A1 | 4/2015 |

OTHER PUBLICATIONS

Chen, Zhixuan et al., "3GPP RAN1 #88bis conference report", May 12, 2017 (no English translation is available).
International Search Report and Written Opinion of International Search Authority for PCT/CN2018/075373 dated Apr. 23 28, 2018 (10 pages).
USPTO, office action for related U.S. Appl. No. 15/888,250 dated Jan. 25, 2019 (16 pages).
USPTO, notice of allowance for related U.S. Appl. No. 15/888,250 dated Sep. 20, 2019 (15 pages).

* cited by examiner

CHANNELS AND PROCEDURES FOR BEAM FAILURE RECOVERY

CROSS REFERENCE TO RELATED APPLICATIONS

This application claims priority under 35 U.S.C. § 119 from U.S. Provisional Application No. 62/536,520, entitled "Method of Beam Failure Recovery," filed on Jul. 25, 2017, the subject matter of which is incorporated herein by reference.

TECHNICAL FIELD

The disclosed embodiments relate generally to wireless communication, and, more particularly, to channels and procedures used for beam failure recovery mechanism in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is hundreds of times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. However, in mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes.

For beamformed access, both ends of a link need to know which beamformers to use. In downlink (DL)-based beam management, the BS side provides opportunities for UE to measure beamformed channel of different combinations of BS beams and UE beams. For example, BS performs periodic beam sweeping with reference signal (RS) carried on individual BS beams. UE can collect beamformed channel state by using different UE beams, and UE then report the collect information to BS. Apparently, UE has the most up-to-date beamformed channel state in DL-based beam management. BS learns the beamformed channel state based on UE feedback, and the feedback may include only strong beam pair links selected by UE.

Beam failure recovery mechanism is designed to handle the rare case beam tracking issue, e.g., when feedback rate for beam management may not be frequent enough. Beam recovery mechanism comprises triggering condition evaluation including beam failure detection and candidate beam identification, beam recovery request transmission, and network reaction monitoring. Details of the beam failure recovery procedures need to be carefully designed to shorten the recovery delay while ensure the robustness.

SUMMARY

A method of beam failure recovery request (BFRQ) transmission is proposed. In a first step of beam failure detection, UE detects a beam failure condition of the original serving beam. In a second step of new candidate beam identification, UE performs measurements for candidate beam selection. In a third step of beam failure recovery request (BFRQ) transmission, UE transmits a BFRQ message to BS upon the triggering condition for BFRQ transmission is satisfied. In a fourth step of monitoring BS response, UE monitors BS response to decide the success or failure of the BFRQ transmission attempt. In one advantageous aspect, the BFRQ transmission is over dedicated contention-free PRACH or PUCCH resources or over contention-based PRACH resources. Furthermore, a beam failure recovery timer is used to oversee the initiation and the termination of the BFRQ transmission.

In one embodiment, a UE receives a plurality of reference signals from a base station in a beamforming communication network. The UE starts a beam failure recovery timer to initialize a beam failure recovery procedure upon detecting a beam failure condition and when the beam failure recovery timer is being configured. The UE transmits a beam failure recovery request (BFRQ) message upon identifying a candidate beam pair link and indicates the candidate beam pair link in the BFRQ message to the base station using dedicated contention-free radio resources. The UE monitors a response from the base station associated with the candidate beam pair link.

In another embodiment, a UE monitors a plurality of reference signals from a base station in a beamforming communication network. The UE starts a beam failure recovery timer to initialize a beam failure recovery procedure upon detecting a beam failure condition and when the beam failure recovery timer is being configured. The UE transmits a beam failure recovery request (BFRQ) message upon identifying a candidate beam pair link and indicates the candidate beam pair link in the BFRQ message to the base station using a contention-based random-access channel (RACH) procedure. The UE monitors a response from the base station associated with the candidate beam pair link.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
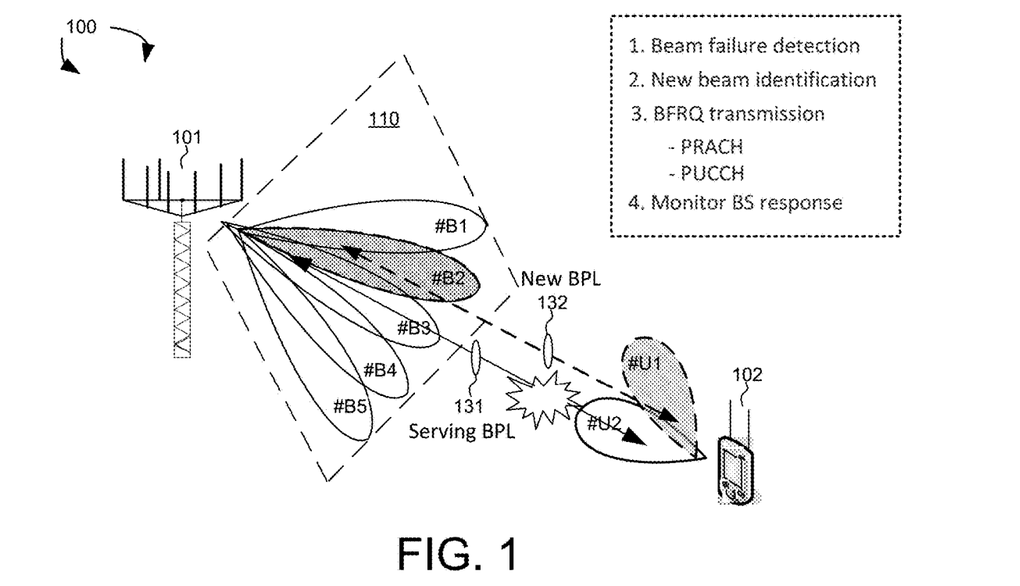
FIG. 1 illustrates a beamforming wireless communication system supporting a four-step beam failure recovery (BFR) procedure with BFR reQuest (BFRQ) transmission in accordance with one novel aspect.

FIG. 1 illustrates a beamforming wireless communication system 100 supporting a four-step beam failure recovery (BFR) procedure with BFR reQuest (BFRQ) transmission in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams # B1, # B2, # B3, # B4, and # B5. The collection of the BS beams # B1-# B5 covers an entire service area of cell 110. Similarly, UE 102 may also apply beamforming to form multiple UE beams, e.g., # U1 and # U2.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

In principle, beam training mechanism, which includes both initial beam alignment and subsequent beam tracking, ensures that BS beam and UE beam are aligned for data communication. For beamformed access, both ends of a link need to know which beamformers to use, e.g., a beam pair link (BPL). In downlink (DL)-based beam management, the BS side provides opportunities for UE to measure beamformed channel of different combinations of BS beams and UE beams. Apparently, UE has the most up-to-date beamformed channel state in DL-based beam management. BS learns the beamformed channel state based on UE feedback. The feedback rate for beamformed channel state is selected to take care of most beam tracking need. For rare cases beam tracking issue, however, such feedback rate for beam management may not be frequent enough. For example, a sudden blockage may result in lost connection. An additional mechanism is thus desired to address the need from rare cases.

In according with one novel aspect, a four-step beam failure recovery procedure from UE perspective is proposed. In a first step of beam failure detection, UE 102 detects a beam failure condition of the original serving BPL 131 formed between BS beam # B3 and UE beam # U2. In a second step of new candidate beam identification, UE 102 performs measurements for candidate beam selection. Note that step 2 is not necessarily preceded by step 1. In a third step of beam failure recovery request (BFRQ) transmission, UE 102 transmits a BFRQ message to BS 101 upon the triggering condition for BFRQ transmission is satisfied. For example, the triggering condition is satisfied when beam failure is detected (e.g., the quality of the serving BPL is worse than a first predefined threshold) and candidate beam is identified (e.g., the quality of the candidate BPL is better than a second predefined threshold). In a fourth step of monitoring BS response, UE 102 monitors BS response to decide the success or failure of the BFRQ transmission attempt. For example, if the BFRQ transmission attempt is successful, then a new BPL 132 formed between BS beam # B2 and UE beam # U1 is selected to become the new serving BPL between BS 101 and UE 102. In one advantageous aspect, the BFRQ transmission is over dedicated contention-free PRACH or PUCCH resources or over contention-based PRACH resources. Furthermore, a beam failure recovery timer is used to oversee the initiation and the termination of the BFRQ transmission.

Figure 2:
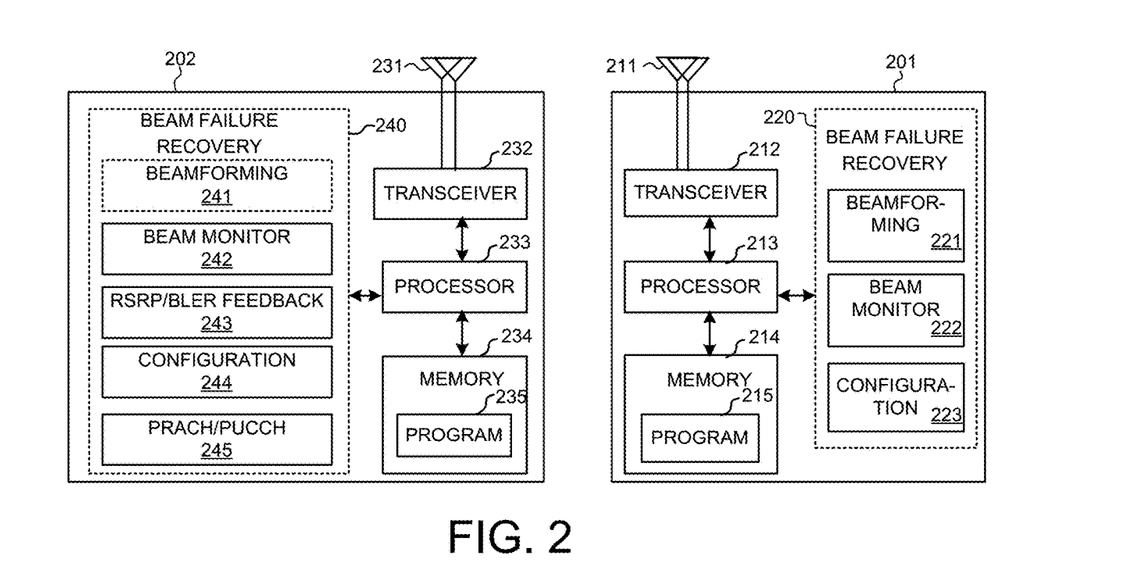
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna array 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam failure recovery module 220, which further comprises a beamforming circuit 221, a beam monitor 222, and a configuration circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Configuration circuit 223 configures radio resources for UEs for uplink transmission including contention-free PRACH and PUCCH and contention-based PRACH.

Similarly, UE 202 comprises a beam failure recovery module 240, which further comprises a beamforming circuit 241, a beam monitor 242, a RSRP/BLER feedback circuit 243, a configuration circuit 244, and a PRACH/PUCCH handling circuit. Beamforming circuit 241 may belong to part of the RF chain, which applies various beamforming weights to multiple antenna elements of antenna 231 and thereby forming various beams. Beam monitor 242 monitors received radio signals and performs measurements of the radio signals over the various beams and maintains a ranking of its preferred BPLs. RSRP/BLER feedback circuit 243 provide beam quality feedback information to BS 201 for BPL alignment status determination. Configuration circuit 244 receives beam failure recovery configuration from BS 201, which includes beam failure recovery trigger condition, beam failure recovery resources, and UE monitoring behavior. Configuration circuit 244 also receives resource allocation from BS 201 for uplink transmission. PRACH and PUCCH handling circuit 245 performs contention-free or contention-based PRACH procedures or uses dedicated PUCCH for BFRQ transmission.

Figure 3:
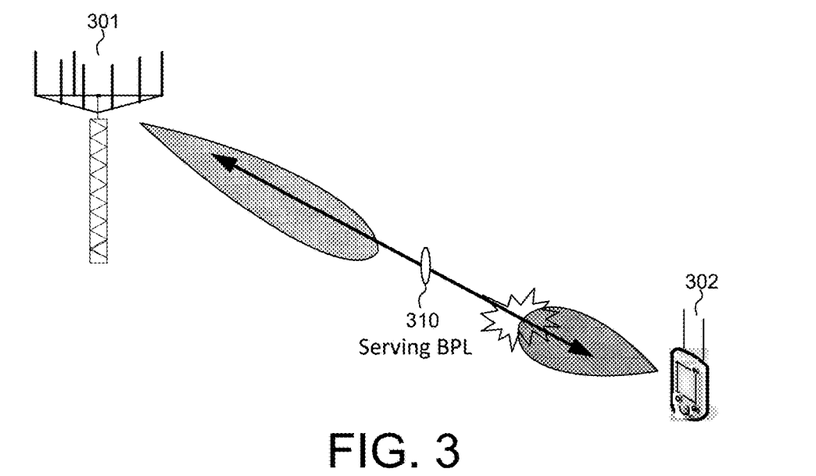
FIG. 3 illustrates a first step of serving beam pair link (BPL) and beam failure detection in a beam failure recovery procedure.

FIG. 3 illustrates a first step of serving control beam pair link (BPL) beam failure detection in a beam failure recovery procedure. In the example of FIG. 3, BS 301 is a serving base station for UE 302 and establishes a serving beam pair link BPL 310 with UE 302 for data communication. Preferably, the serving BPL is associated to control channel beam, e.g., physical downlink control channel (PDCCH). One triggering condition for beam failure recovery is a beam failure detection of the serving BPL. The quality of the serving BPL can be acquired by monitoring all or a subset of reference signals. Note that more than one serving BPLs may be used as serving control channels between the BS and the UE. In such case, preferably beam failure recovery is triggered when all serving control channel fails. In one example, beam failure is detected when the Block Error Rate (BLER) of the serving BPL (e.g., PDCCH) is worse than a predefined threshold. For UE, only periodic channel state information reference signal (CSI-RS) or synchronization signal block (SSB) which is spatially quasi-collocated (QCL'ed) with control channel (e.g., PDCCH) demodulation reference signal (DMRS) is used for beam failure detection.

Figure 4:
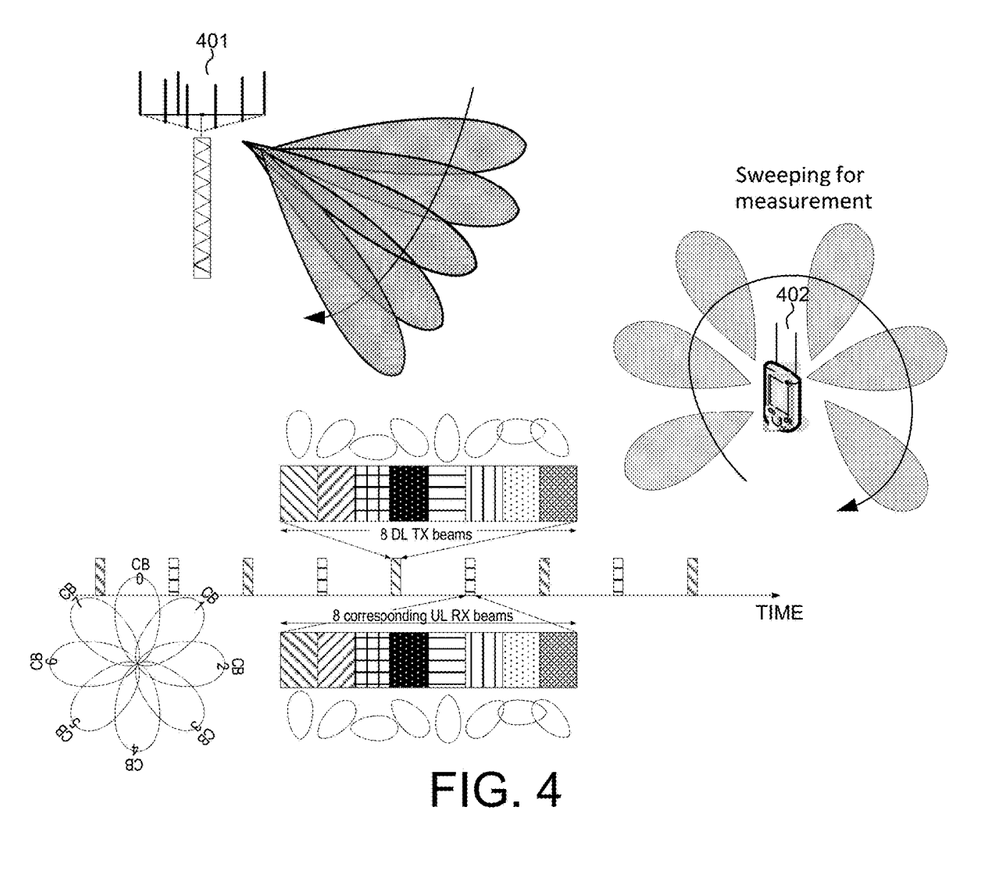
FIG. 4 illustrates a second step of beam monitoring and new beam identification in a beam failure recovery procedure.

FIG. 4 illustrates a second step of beam monitoring and new beam identification in a beam failure recovery procedure. In the example of FIG. 4, BS 401 is a serving base station for UE 402. Another triggering condition for beam failure recovery is a candidate beam monitoring and new beam identification based on measurements performed on all or a subset of reference signals. In general, UE monitoring behavior follows similar procedure as DL beam management procedure in multi-beam operation. As depicted by FIG. 4, BS 401 transmits periodic DL RS by using a set of provisioned BS control beams CB0-CB8 with moderate beamforming gain. Individual beam-specific reference signals are transmitted in TDM/FDM/CDM manner or a combination of them. UL opportunities that include random access resources in a set of BS UL beams are illustrated as well. UE monitors the quality of combinations of BS-UE BPLs in background by sweeping through different beams. The quality is measured based on UE-specifically configured CSI-RS resources and/or SS-blocks resources. The measurement metric for candidate beam selection is layer-1 reference signal received power (L1-RSRP). A new BPL is identified when the L1-RSRP of the new BPL is above a threshold. UE keeps a ranking of its preferred BPLs and can later select from the preferred BPLs that are not currently used for communication for beam failure recovery purpose.

Figure 5:
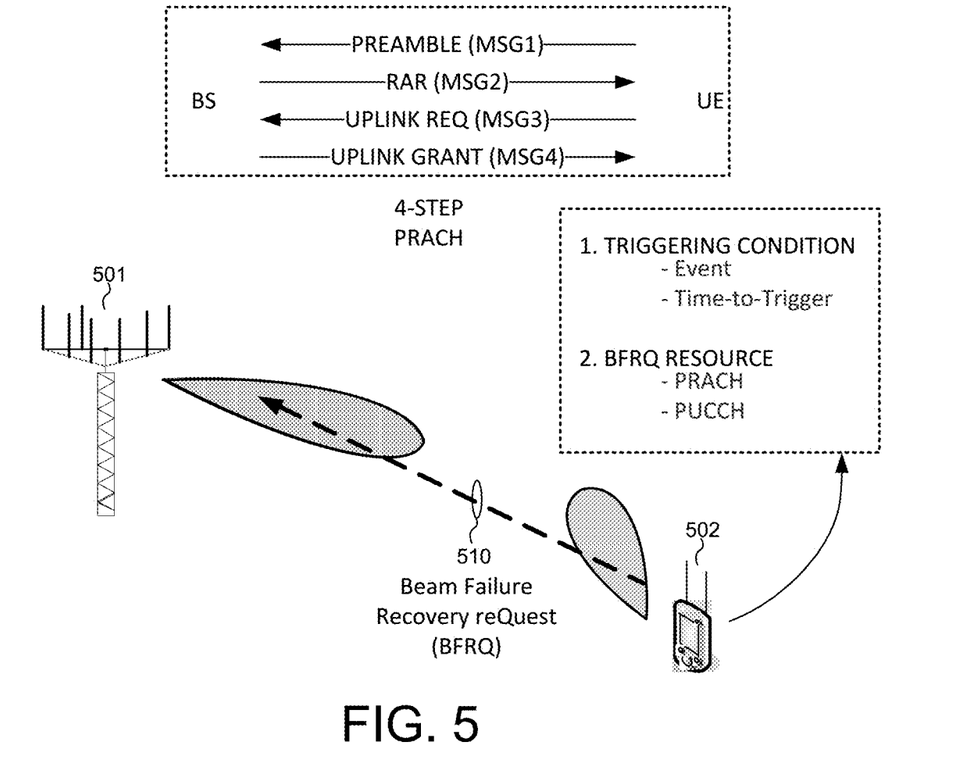
FIG. 5 illustrates a third step of triggering condition and beam failure recovery request transmission in a beam failure recovery procedure.

FIG. 5 illustrates a third step of triggering condition and beam failure recovery request (BFRQ) transmission in a beam failure recovery procedure. The BFRQ transmission involves two aspects, the first is the trigger condition, and the second is the selection of BFRQ resources. Triggering UE-initiated transmission for beam failure recovery requires UE to monitor both serving BPL(s) and good BPL currently not used for communication. In case more than one serving BPLs are used, beam failure recovery is triggered when all serving BPLs are lost. Both absolute and relative thresholds similar to RRC measurement events can be used. In one embodiment, the triggering condition for beam failure recovery is satisfied when the serving is worse than a first threshold and the candidate is better than a second threshold. Time-to-trigger can be applied for event evaluation, i.e., event criteria should be satisfied for a certain amount of time before triggering beam failure recovery request.

Once the triggering condition is satisfied, UE 502 transmits a Beam Failure Recovery reQuest (BFRQ) 510 to BS 501 over beam failure recovery resources. In a first embodiment, UE 502 is configured with dedicated beam failure recovery resources in Physical Random-Access Channel (PRACH) symbols. In a second embodiment, UE 502 is configured with dedicated beam failure recovery resource, e.g., UL control channel similar to LTE PUCCH. In a third embodiment, contention-based RACH procedure and resources can be used for BFRQ transmission.

Figure 6:
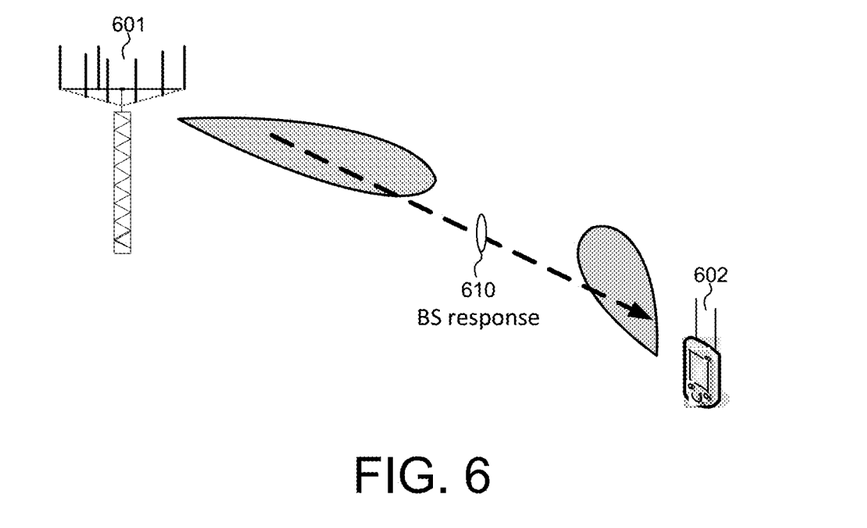
FIG. 6 illustrates a forth step of monitoring base station response and decide beam failure recovery in a beam failure recovery procedure.

FIG. 6 illustrates a forth step of monitoring base station response. Upon beam failure recovery request reception by BS 601, the network attempts connection with UE in UE-indicated BPL. Through the content of network reaction, network can for example, 1) trigger an aperiodic measurement and corresponding reporting in the UE-indicated beam pair link; 2) start dedicated transmission in the UE-indicated BPL; or 3) trigger beam switching from UE-indicated BPL.

Figure 7:
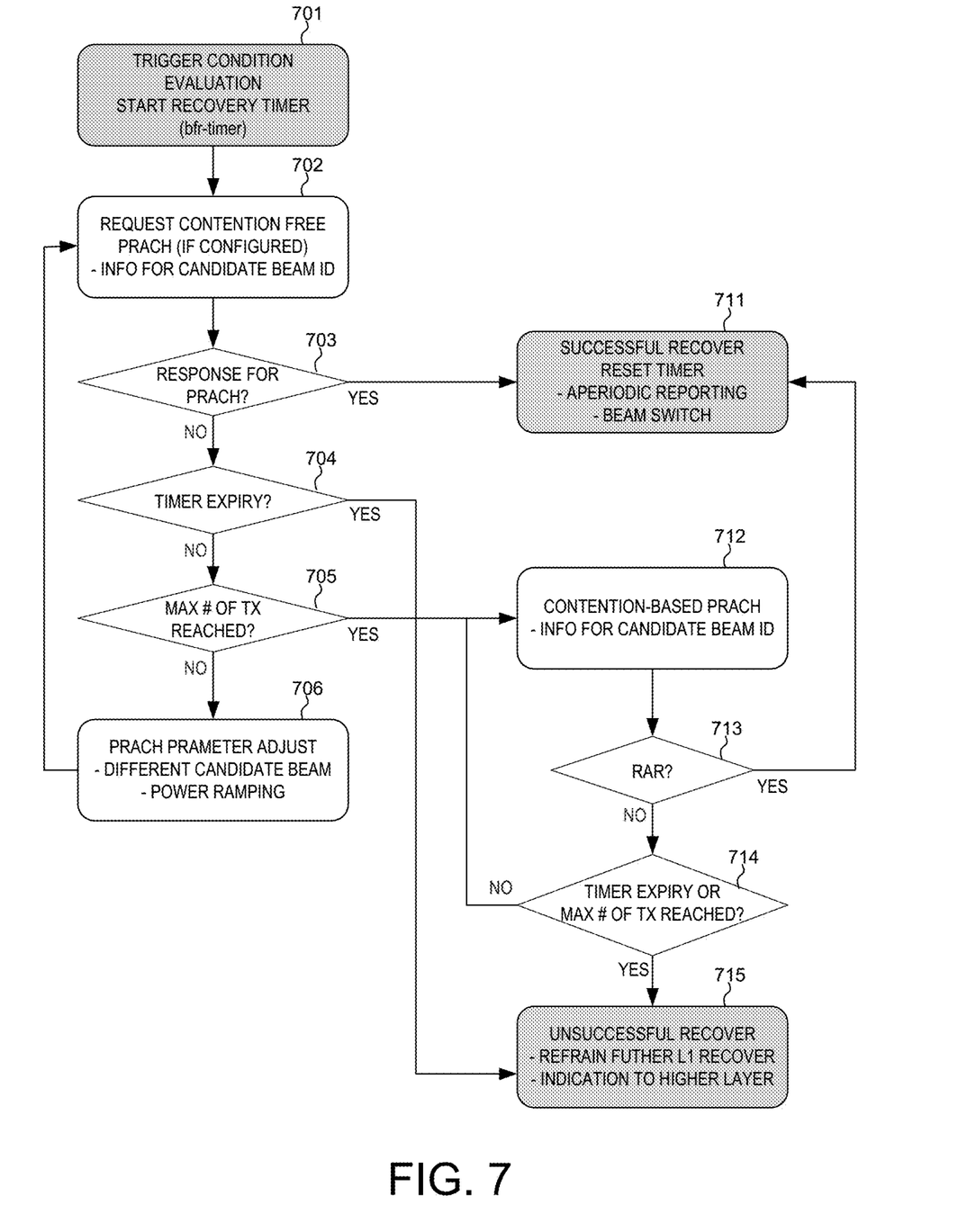
FIG. 7 illustrates a first embodiment of BFRQ transmission using physical random-access channel (PRACH) based transmission.

FIG. 7 illustrates a first embodiment of BFRQ transmission using physical random-access channel (PRACH) based transmission. In step 701, UE evaluates the trigger condition for initiating a beam failure recovery procedure. Typically, UE starts a beam failure recovery timer (BFR-timer) upon all serving BPLs are lost. However, the beam failure recovery message is triggered only when all serving BPLs are lost as well as a candidate beam is identified. In step 702, UE applies dedicated contention free PRACH resources (if configured by the NW) for transmitting a BFRQ message. In step 703, UE checks if a response for the PRACH transmission has been received. If the answer is yes, then the recovery procedure is successful and UE reset the BFR-timer (step 711). UE reacts as indicated by the NW, e.g., perform aperiodic reporting and beam switching. If the answer to step 703 is no, then UE checks if the BFR-timer has expired in step 704, if the answer is yes, then the recovery procedure is unsuccessful. UE refrains from further L1 recovery and indicates the failure to higher layer (step 715). If the answer to step 704 is no, then UE checks if a maximum number of transmission has reached in step 705. If the answer is no, then UE adjusts the PRACH parameters. The parameters can include ramping up TX power for the BFRQ transmission and optionally using a different candidate beam (step 706). UE then goes back to step 702 and continues the contention-free PRACH procedure. Note that the use of BFR-timer is optional. One possibility is not to configure timer value and another possibility is to set infinity or a very large value.

If the answer to step 705 is yes, then UE may optionally start to perform a contention-based PRACH procedure for the BFRQ transmission (step 712). In step 713, UE checks if a random-access response (RAR) message has been received. If the answer is yes, then UE goes to step 711. If the answer is no, then UE checks if the BFR-timer has expired, or if a maximum number of transmission has reached in step 714. If the answer is yes, then UE goes to step 715. If the answer is no, then UE goes back to step 712 and continues the contention-based PRACH procedure. The procedure for contention-based PRACH could be the same as that for initial access. It could consider non-beam correspondence at UE by e.g., multiple PRACH transmission in a round (i.e., before a RAR window), change of candidate beam and/or power ramping when a corresponding RAR is not received. When NW receives Msg3 without RRC message, NW can identify the UE via C-RNTI in Msg3 MAC-CE. Msg4 could thus serve as am implicit indication of NW acknowledgement. Beam management related operation can be triggered by Msg4 DCI, or DCI after Msg4, e.g., NW trigger aperiodic beam measurement and reporting. For PRACH-based transmission, its open-loop power control can be based on the identified candidate beam.

It is noted that the flow related to the use of contention-based PRACH resources can be optional. On the other hand, the use of contention free PRACH resources can also be optional, for example, if the maximum number of transmission in step 705 is not configured or configured as 0. Similarly, the beam failure recovery timer (BFR-timer) can be optional and is applied when, for example, a UE is configured with BFR-timer.

Figure 8:
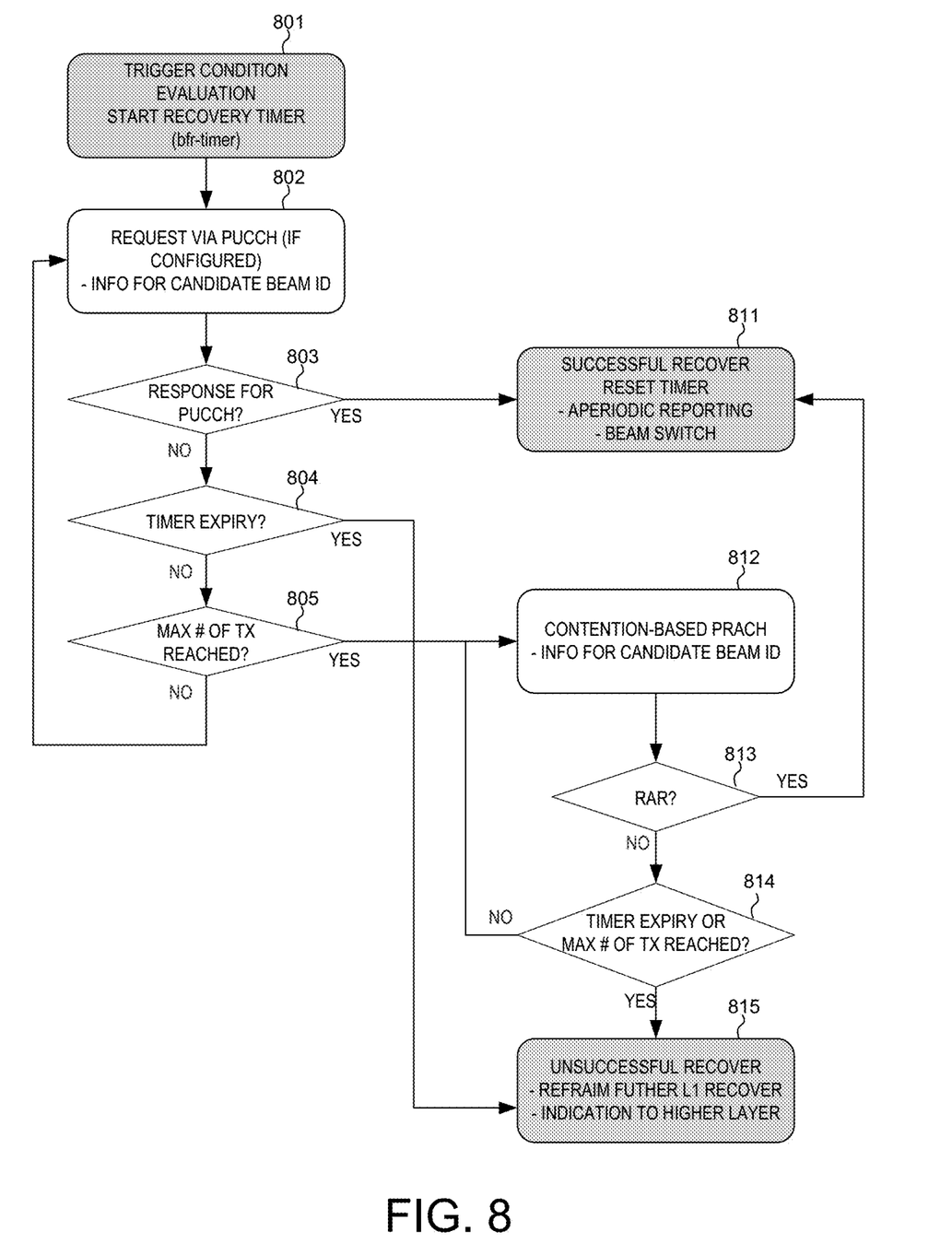
FIG. 8 illustrates a second embodiment of BFRQ transmission using physical uplink control channel (PUCCH) based transmission.

FIG. 8 illustrates a second embodiment of BFRQ transmission using physical uplink control channel (PUCCH) based transmission. The embodiment of FIG. 8 is similar to the embodiment of FIG. 7, except in step 802, UE applies dedicated PUCCH resources, instead of dedicated PRACH resources, for BFRQ transmission. In step 803, UE monitors NW response for PUCCH-based BFRQ message. The response could be observed in candidate beam whose info is carried in the BFRQ; or could be in a DL beam that is spatially QCL'ed to the DL serving beam which is associated with the UL serving beam used for PUCCH transmission. The NW response can correspond to a dedicated message scrambled by UE-specific identity, e.g., C-RNTI in LTE. Steps 804 to 815 are similar to steps 704 to 715 of FIG. 7, except there is no corresponding step 706 for parameter adjustment. Similar to the first embodiment, the flow related to the use of contention-based PRACH resources can be optional. In addition, the beam failure recovery timer (BFR-timer) can be optional and is applied when, for example, a UE is configured with BFR-timer.

Figure 9:
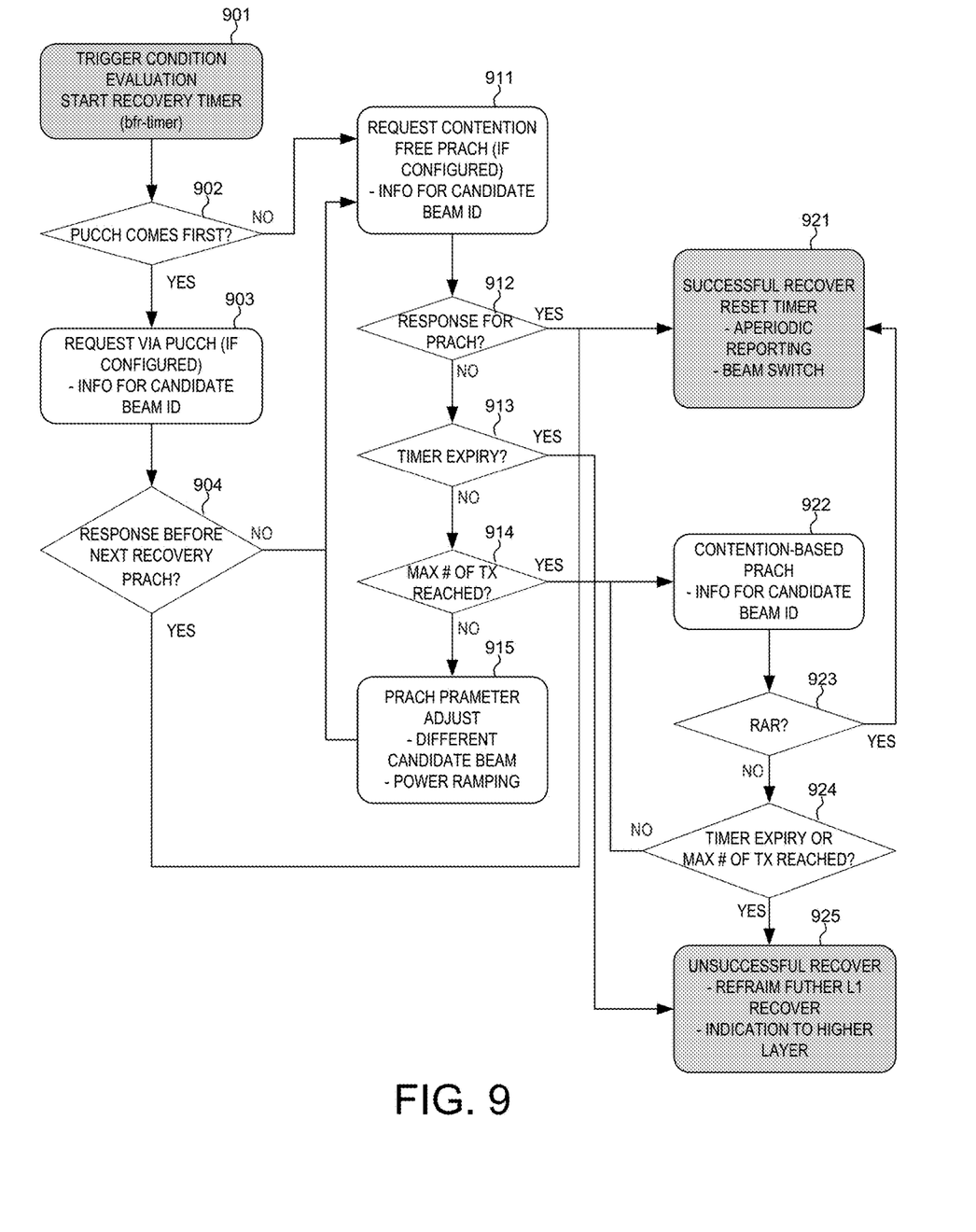
FIG. 9 illustrates a third embodiment of BFRQ transmission with sequential use of opportunistic PUCCH and subsequent PRACH.

FIG. 9 illustrates a third embodiment of BFRQ transmission with sequential use of opportunistic PUCCH and subsequent PRACH. In step 901, UE evaluates the trigger condition for initiating a beam failure recovery procedure. Typically, UE starts a beam failure recovery timer (BFR-timer) upon all serving BPLs are lost. However, the beam failure recovery message is triggered only when all serving BPLs are lost as well as a candidate beam is identified. In step 902, UE checks whether dedicated PUCCH resources come first. If the answer to step 902 is yes, then in step 903, UE sends BFRQ via PUCCH if configured. In step 904, UE checks if it receives a response before the next dedicated PRACH resource becomes available. If the answer to step 904 is yes, then the recovery procedure is successful and UE resets the BFR-timer (step 921). If the answer to step 904 is no, then UE goes to step 911 to try contention free PRACH. If the answer to step 902 is no, then UE also goes to step 911 and sends BFRQ via contention free PRACH if configured.

Note that both dedicated PUCCH and PRACH resources are periodically allocated. Typically, the periodicity of PUCCH is shorter than PRACH. As a result, UE can adopt an opportunistic approach to use PUCCH, e.g., use PUCCH if the PUCCH resource occurs first, otherwise use PRACH. For contention free PRACH, steps 911 to 915 is similar to steps 702 to 706 of FIG. 7. UE may also go to step 922 and try contention-based PRACH if the contention free PRACH is not successful. Steps 922 to 925 are similar to steps 712 to 715 of FIG. 7.

Figure 10:
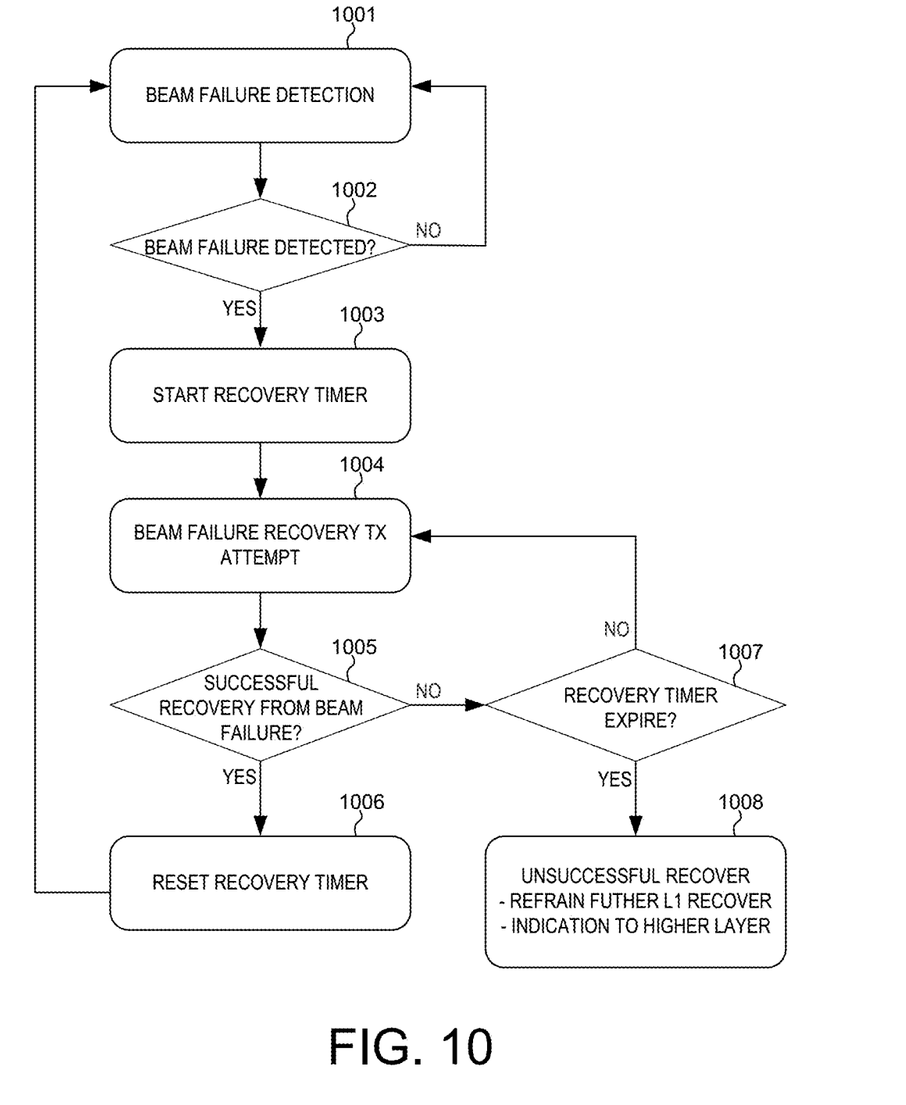
FIG. 10 illustrates a fourth embodiment of BFR procedure with initiation and termination applying a beam failure recovery timer.

FIG. 10 illustrates a fourth embodiment of BFR procedure with initiation and termination applying a beam failure recovery timer. In general, a beam failure recovery timer (BFR-timer) can be used to oversee the beam failure recovery procedure. In step 1001, UE detects for beam failure condition. If beam failure is not detected in step 1002, UE goes back to step 1001. If beam failure is detected, UE goes to step 1003 and starts the BFR-timer. The timer is started when beam failure is detected, even though the trigger condition for BFRQ transmission may not be met. In step 1004, UE attempts with BFRQ transmission if the triggering condition is met. In step 1105, UE checks if the recovery procedure is successful. If yes, then UE resets the BFR-timer and goes back to step 1001. If no, then UE checks if the BFR-timer has expired in step 1007. If the answer is yes, then the recovery procedure is unsuccessful. In step 1008, UE refrains from further L1 recovery and indicates the failure to higher layer. If the answer is no, then UE goes back to step 1004 and tries again.

The trigger condition for beam failure recovery procedure is based on evaluation on the quality of control beams. Two principles can be considered. First, when quality of all active control beams of a UE is assessed as low enough, and a candidate beam can be identified form UE perspective. In certain circumstances, e.g., when beam correspondence does not hold, candidate beam is not a must for triggering BFRQ transmission, e.g., available PUCCH can be attempted. Second, when quality of a subset of all active control channel beams of a UE is assessed as low enough, and a candidate beam can be identified from UE perspective. In this case, the candidate beam is preferably one of the active control channel beams that is not within the failing subset. If the candidate beam is one of the active control channel beams that is not within the failing subset, prior information on timing advance of the candidate beam is available. In certain circumstances, e.g., when beam correspondence does not hold, candidate beam is not a must for triggering BFRQ transmission, e.g., available PUCCH can be attempted.

Figure 11:
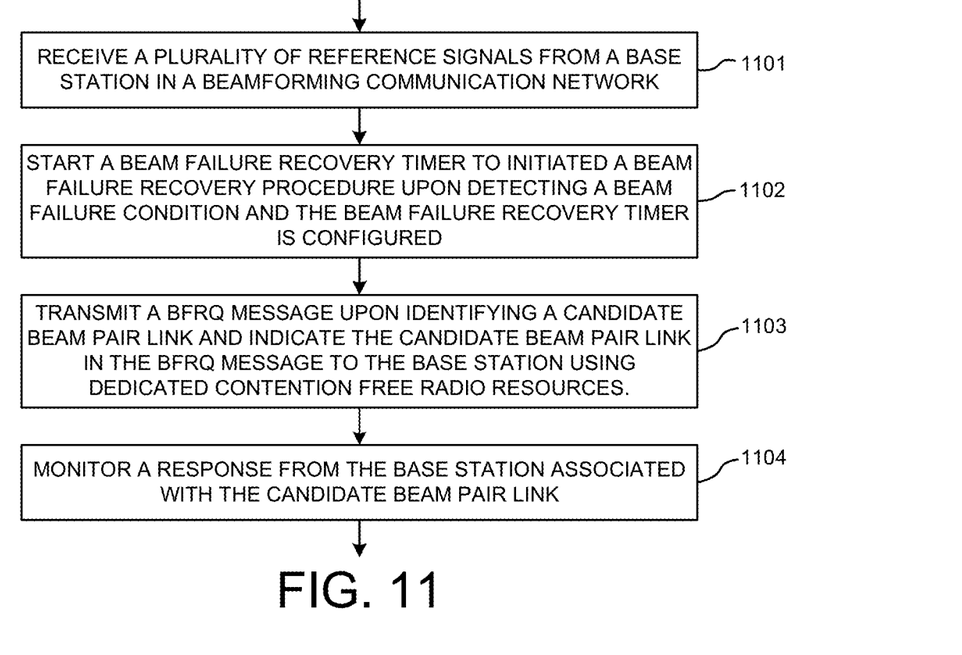
FIG. 11 is a flow chart of a method of beam failure recovery and BFRQ transmission using contention free channel access in a beamforming system in accordance with one novel aspect.

FIG. 11 is a flow chart of a method of beam failure recovery and BFRQ transmission using contention free channel access in a beamforming system in accordance with one novel aspect. In step 1101, a UE receives a plurality of reference signals from a base station in a beamforming communication network. In step 1102, the UE starts a beam failure recovery timer to initialize a beam failure recovery procedure upon detecting a beam failure condition and when the beam failure recovery timer is being configured. In step 1103, the UE transmits a beam failure recovery request (BFRQ) message upon identifying a candidate beam pair link and indicates the candidate beam pair link in the BFRQ message to the base station using dedicated contention-free radio resources. In step 1104, the UE monitors a response from the base station associated with the candidate beam pair link.

Figure 12:
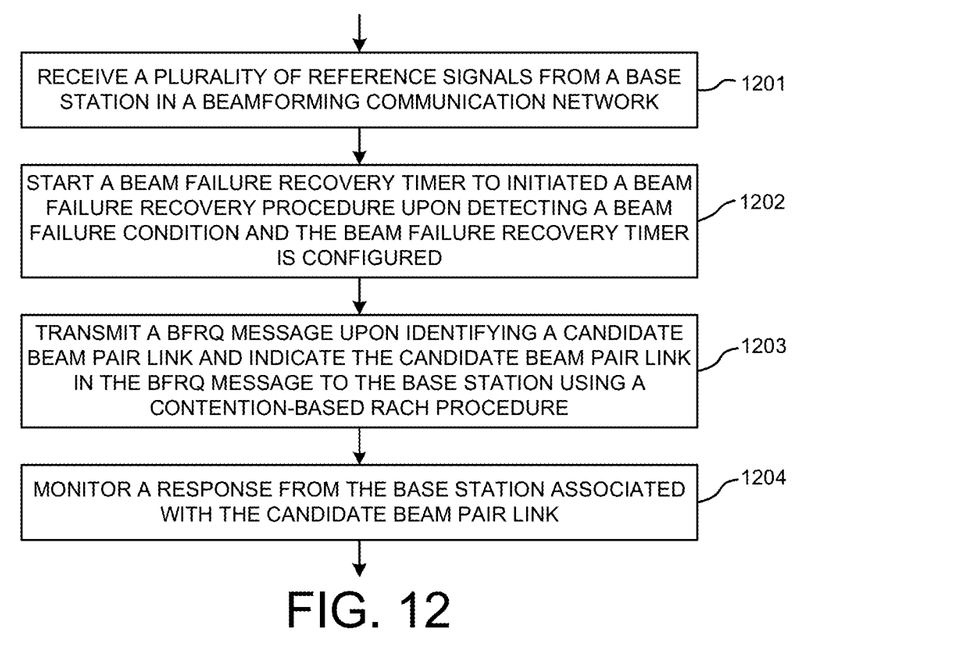
FIG. 12 is a flow chart of a method of beam failure recovery and BFRQ transmission using contention-based channel access in a beamforming system in accordance with one novel aspect.

FIG. 12 is a flow chart of a method of beam failure recovery and BFRQ transmission using contention-based channel access in a beamforming system in accordance with one novel aspect. In step 1201, a UE monitors a plurality of reference signals from a base station in a beamforming communication network. In step 1202, the UE starts a beam failure recovery timer to initialize a beam failure recovery procedure upon detecting a beam failure condition and when the beam failure recovery timer is being configured. In step 1203, the UE transmits a beam failure recovery request (BFRQ) message upon identifying a candidate beam pair link and indicates the candidate beam pair link in the BFRQ message to the base station using a contention-based random-access channel (RACH) procedure. In step 1204, the UE monitors a response from the base station associated with the candidate beam pair link.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a plurality of reference signals from a base station by a user equipment (UE) in a beamforming communication network;
   starting a beam failure recovery timer to initialize a beam failure recovery procedure upon detecting a beam failure condition and when the beam failure recovery timer is being configured;
   transmitting a beam failure recovery request (BFRQ) message upon identifying a candidate beam pair link and indicates the candidate beam pair link in the BFRQ message to the base station using dedicated contention-free radio resources, wherein the contention free radio resources are dedicated radio resources associated with candidate beams; and
   monitoring a response from the base station associated with the candidate beam pair link.

2. The method of claim 1, wherein the beam failure condition is detected when all or a subset of serving beam pair links are lost.

3. The method of claim 1, wherein the contention free radio resources are dedicated physical random-access channel (PRACH) radio resources associated with the candidate beam pair link.

4. The method of claim 3, wherein the response from the base station associated with the candidate beam pair link is scramble by a UE-specific identity.

5. The method of claim 3, wherein the UE changes the candidate beam pair link for BFRQ retransmission when a corresponding random-access response (RAR) is not received.

6. The method of claim 3, wherein the UE ramps up a power for BFRQ retransmission when a corresponding random-access response (RAR) is not received.

7. The method of claim 1, wherein the contention free radio resources are dedicated physical uplink control channel (PUCCH) radio resources associated with the candidate beam pair link.

8. The method of claim 1, wherein the UE terminates the BFRQ transmission over the dedicated contention-free radio resources when the beam failure recovery timer expires.

9. The method of claim 1, wherein the UE sends the BFRQ over a dedicated physical uplink control channel (PUCCH) if the PUCCH is first available to the UE, otherwise the UE sends the BFRQ request over a dedicated physical random-access channel (PRACH).

10. The method of claim 1, further comprising:
    performing a contention-based random-access channel (RACH) procedure when the UE has reached a maximum number of BFRQ transmission over the contention free radio resources.

11. A User Equipment (UE), comprising:
    a radio frequency (RF) receiver that receives a plurality of reference signals from a base station by a user equipment (UE) in a beamforming communication network;
    a beam failure recovery timer that is started to initialize a beam failure recovery procedure upon detecting a beam failure condition and when the beam failure recovery timer is being configured; and
    a radio frequency (RF) transmitter that transmits a beam failure recovery request (BFRQ) message upon identifying a candidate beam pair link and indicates the candidate beam pair link in the BFRQ message to the base station using dedicated contention-free radio resources, wherein the contention free radio resources are dedicated radio resources associated with candidate beams, wherein the UE monitors a response from the base station associated with the candidate beam pair link.

12. The UE of claim 11, wherein the beam failure condition is detected when all or a subset of serving beam pair links are lost.

13. The UE of claim 11, wherein the contention free radio resources are dedicated physical random-access channel (PRACH) radio resources associated with the candidate beam pair link.

14. The UE of claim 13, wherein the response from the base station associated with the candidate beam pair link is scramble by a UE-specific identity.

15. The UE of claim 13, wherein the UE changes the candidate beam pair link for BFRQ retransmission when a corresponding random-access response (RAR) is not received.

16. The UE of claim 13, wherein the UE ramps up a power for BFRQ retransmission when a corresponding random-access response (RAR) is not received.

17. The UE of claim 11, wherein the contention free radio resources are dedicated physical uplink control channel (PUCCH) radio resources associated with the candidate beam pair link.

18. The UE of claim 11, wherein the UE terminates the BFRQ transmission over the dedicated contention-free radio resources when the beam failure recovery timer expires.

19. The UE of claim 11, wherein the UE sends the BFRQ over a dedicated physical uplink control channel (PUCCH) if the PUCCH is first available to the UE, otherwise the UE sends the BFRQ request over a dedicated physical random-access channel (PRACH).

20. The UE of claim 11, wherein the UE performs a contention-based random-access channel (RACH) procedure when the UE has reached a maximum number of BFRQ transmission over the contention free radio resources.

\* \* \* \* \*